US012578735B2

(12) United States Patent
Gao et al.

(10) Patent No.: US 12,578,735 B2
(45) Date of Patent: Mar. 17, 2026

(54) AUTONOMOUS MOBILE DEVICE, CONTROL METHOD AND APPARATUS FOR AUTONOMOUS MOBILE DEVICE, AND STORAGE MEDIUM

(71) Applicant: Qfeeltech (Beijing) Co., Ltd., Beijing (CN)

(72) Inventors: Shaoxuan Gao, Beijing (CN); Xi Zhao, Beijing (CN)

(73) Assignee: Qfeeltech (Beijing) Co., Ltd., Beijing (CN)

( * ) Notice: Subject to any disclaimer, the term of this patent is extended or adjusted under 35 U.S.C. 154(b) by 60 days.

(21) Appl. No.: 18/731,317

(22) Filed: Jun. 2, 2024

(65) Prior Publication Data

US 2024/0319742 A1    Sep. 26, 2024

Related U.S. Application Data

(63) Continuation of application No. PCT/CN2022/136454, filed on Dec. 5, 2022.

(30) Foreign Application Priority Data

Dec. 15, 2021    (CN) .......................... 202111536344.0

(51) Int. Cl.
G05D 1/622        (2024.01)
G05D 1/242        (2024.01)
        (Continued)

(52) U.S. Cl.
CPC ............. G05D 1/622 (2024.01); G05D 1/242 (2024.01); G05D 2101/20 (2024.01); G05D 2107/40 (2024.01); G05D 2111/14 (2024.01)

(58) Field of Classification Search
CPC .... G05D 1/622; G05D 1/242; G05D 2101/20; G05D 2107/40; G05D 2111/14;
        (Continued)

(56) References Cited

U.S. PATENT DOCUMENTS 11,815,631 B1 * 11/2023 Ebrahimi Afrouzi .......................
                                                    G01S 7/4876
2020/0209880 A1 *  7/2020 Bai ....................... G05D 1/0246
        (Continued)

FOREIGN PATENT DOCUMENTS

CN        106934347 A      7/2017
CN        109101861 A      12/2018
        (Continued)

OTHER PUBLICATIONS

Machine translation of CN112001287 retrieved from Espacenet on Sep. 28, 2025 (Year: 2025).*
        (Continued)

*Primary Examiner* — Thomas Ingram
(74) *Attorney, Agent, or Firm* — Alleman Hall LLP

(57)        ABSTRACT
The present disclosure relates to an autonomous mobile device and its control method and apparatus and a storage medium, the control method includes: an obtaining step configured to obtain point cloud data of the autonomous mobile device in a current work environment; a determination step configured to determine whether there exists an obstacle in the work environment based on the point cloud data; a processing step configured to, when it is determined that there exists an obstacle, recognize a type of the obstacle based on the point cloud data, and execute an obstacle avoidance action corresponding to the type of the obstacle. As such, the robustness of the obstacle avoidance action can be increased.

18 Claims, 7 Drawing Sheets

(51) Int. Cl.
  *G05D 101/20*    (2024.01)
  *G05D 107/40*    (2024.01)
  *G05D 111/10*    (2024.01)

(58) Field of Classification Search
  CPC .......... G05D 2105/10; G05D 2109/10; G05D 2111/17; G05D 1/024; G01S 17/08; G01S 17/931
  See application file for complete search history.

(56) References Cited

U.S. PATENT DOCUMENTS

| | | |
|---|---|---|
| 2021/0049376 A1 | 2/2021 | Cui et al. |
| 2021/0223778 A1* | 7/2021 | Endo ........................ G01C 3/06 |
| 2024/0077870 A1* | 3/2024 | Park ........................ G06N 20/00 |
| 2024/0310517 A1* | 9/2024 | Takahata .............. G01S 15/931 |
| 2024/0310851 A1* | 9/2024 | Ebrahimi Afrouzi ... G01S 17/87 |

FOREIGN PATENT DOCUMENTS

| | | |
|---|---|---|
| CN | 110522359 A | 12/2019 |
| CN | 110632617 A | 12/2019 |
| CN | 110719442 A | 1/2020 |
| CN | 111142526 A | 5/2020 |
| CN | 111309032 A | 6/2020 |
| CN | 112001287 A | 11/2020 |
| CN | 112622923 A | 4/2021 |
| WO | 2020/141257 A1 | 7/2020 |

OTHER PUBLICATIONS

International Search Report and Written Opinion dated Feb. 13, 2023, issued in PCT/CN2022/136454, filed on Dec. 5, 2022, and their English machine translations (14 pages).
Extended European Search Report issued on Jul. 17, 2025, in European Patent Application No. EP 22906291.4, filed on Jun. 12, 2024 (8 pages).

* cited by examiner

700

800

AUTONOMOUS MOBILE DEVICE, CONTROL METHOD AND APPARATUS FOR AUTONOMOUS MOBILE DEVICE, AND STORAGE MEDIUM

CROSS REFERENCE TO RELATED APPLICATIONS

This application is a continuation of International Application No. PCT/CN2022/136454, filed on Dec. 5, 2022, which claims priority to Chinese Patent Application No. 202111536344.0, filed on Dec. 15, 2021. The entire contents of the above-referenced applications are incorporated herein by reference.

TECHNICAL FIELD

The present disclosure relates to smart home technology, and in particular, to an autonomous mobile device, a control method and apparatus for the autonomous mobile device, and a storage medium.

BACKGROUND TECHNOLOGY

As the advancement of technology and the improvement of the living standards, more and more autonomous mobile devices configured with different functions have entered people's homes, such as autonomous cleaning robots, companion type mobile robots, etc., which make people's life more comfortable and convenient.

Autonomous mobile devices are smart devices configured to autonomously execute predetermined tasks within predetermined work zones. Currently, autonomous mobile devices typically include, but are not limited to, autonomous cleaning robots (e.g., smart floor sweeping robots, smart floor mopping robots, window cleaning robots), companion type mobile robots (e.g., smart electronic pets, nanny robots), service type mobile robots (e.g., reception robots for restaurants, hotels, meeting places), industrial patrol and inspection smart devices (e.g., electric power line patrol and inspection robots, smart forklifts, etc.), security robots (e.g., home or commercial use smart guard robots), etc.

Light detection and ranging (Lidar) devices are one of current mainstream sensors, which have been widely used in various scenes. For autonomous mobile devices disclosed in some existing technologies, autonomous mobile devices may be mounted with a Lidar device. Through the Lidar device, reliable information of obstacles surrounding (adjacent to) the autonomous mobile device may be obtained. Then, through analyzing the shapes of the obstacles, the autonomous mobile device may execute corresponding actions to avoid the obstacles (the actions may be referred to as obstacle avoidance actions).

Although information of obstacles adjacent to the autonomous mobile device may be obtained through the Lidar device, due to reasons such as Lidar errors or characteristics of obstacles, the obtained information of obstacle may not be accurate (for example, actual obstacles such as a glass door may not have been detected; or recorded location information of the obstacle is inaccurate, etc.). Therefore, the robustness of the obstacle avoidance action carried out based on the information of the obstacle may not be strong.

SUMMARY OF DISCLOSURE

In light of the above, the present disclosure provides an autonomous mobile device, a control method and apparatus for the autonomous mobile device, and a storage medium.

According to a first aspect of the present disclosure, a control method for an autonomous mobile device is provided. The control method includes: an obtaining step, configured to obtain point cloud data of the autonomous mobile device in a current work environment; a determination step, configured to determine whether there exists an obstacle in the work environment based on the point cloud data; a processing step, configured to recognize a type of the obstacle based on the point cloud data when it is determined that the obstacle exists, and execute an obstacle avoidance action corresponding to the type of the obstacle.

According to a second aspect of the present disclosure, a control apparatus of an autonomous mobile device is provided. The control apparatus includes: an obtaining unit, configured to obtain point cloud data of the autonomous mobile device in a current work environment; a determination unit, configured to determine whether there exists an obstacle in the work environment based on the point cloud data; a processing unit, configured to recognize a type of the obstacle based on the point cloud data when it is determined that the obstacle exists, and execute an obstacle avoidance action corresponding to the type of the obstacle.

According to a third aspect of the present disclosure, a control apparatus of an autonomous mobile device is provided. The control apparatus includes: a processor; a storage device configured to store processor-executable (or computer-executable) instructions; wherein, the processor is configured to execute the above control method.

According to a fourth aspect of the present disclosure, an autonomous mobile device is provided, which includes: the above-described control apparatus; and a motion mechanism, configured to move the autonomous mobile device in the current work environment; wherein when there exists an obstacle in the current work environment, the motion mechanism moves based on the obstacle avoidance action to avoid the obstacle.

According to a fifth aspect of the present disclosure, a non-transitory computer-readable storage medium is provided. When instructions stored in the storage medium are executed by the processor of the control apparatus of the autonomous mobile device, the processor executes the above-described control method.

As such, compared to existing technologies, in which shapes of the obstacles are determined based on information of the obstacles obtained through a Lidar device and corresponding obstacle avoidance actions are executed, according to the present disclosure, a determination may be made as to whether there exists an obstacle in the work environment based on point cloud data of the autonomous mobile device in the current work environment (e.g., a set of relative locations of obstacle(s)), and when it is determined that there exists an obstacle, a type of the obstacle may be recognized based on the point cloud data and an obstacle avoidance action corresponding to the recognized type may be executed. Therefore, more accurate obstacle avoidance actions may be carried out for different types of obstacles, thereby increasing the robustness of obstacle avoidance actions.

Based on detailed descriptions of illustrative embodiments described with reference to the following accompanying drawings, other features and aspects of the present disclosure will become clearer.

BRIEF DESCRIPTIONS OF DRAWINGS

The drawings, which are included in the specification and form a part of the specification, together with the specification, show illustrative embodiments, features and aspects of the present disclosure, and are used to explain the principle of the present disclosure.

DETAILED DESCRIPTIONS

Figure 1:
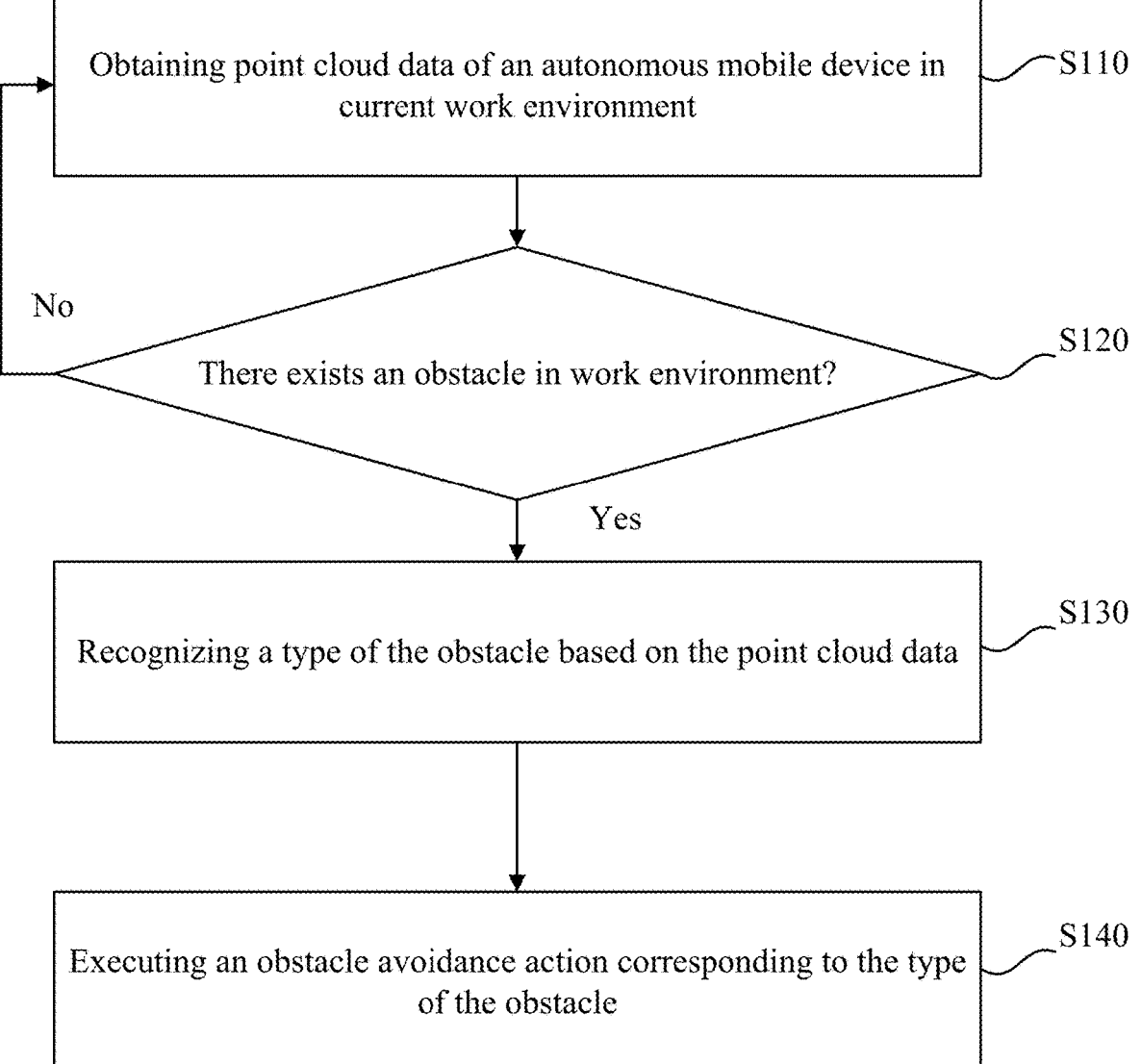
FIG. 1 is a flowchart illustrating a control method for an autonomous mobile device according to an illustrative embodiment.

Next, various illustrative embodiments, features, and aspects of the present disclosure will be described in detail with reference to the accompanying drawings. The same labels in the drawings indicate the same function or similar components. Although various aspects of the embodiments are shown in the accompanying drawings, unless otherwise noted, the drawings are not to scale.

The term "illustrative" used herein means "as an example, embodiment or explanatory." Any embodiment described by the term "illustrative" should not be interpreted as being advantageous to or better than other embodiments.

In addition, to better explain the present disclosure, in the detailed embodiments described below, various specific details are provided. A person having ordinary skills in the art should understand, without certain details, the present disclosure can still be implemented. In some embodiments, methods, means, components and electric circuits that are known to a person having ordinary skills in the art are not described in detail, such that the principle of the present disclosure can be prominently described.

As described above, in existing technologies, information of obstacles in the work environment is obtained through a Lidar device, shapes of the obstacles are determined based on the information of the obstacles, and corresponding obstacle avoidance actions are executed. Due to reasons such as Lidar device errors and characteristics of obstacles, information of obstacles obtained through the Lidar device may not be accurate. As such, shapes of the obstacles determined based on the inaccurate information of obstacles may not be accurate. Furthermore, corresponding obstacle avoidance actions carried out may not be suitable for the obstacles in the work environment. Therefore, the robustness of the obstacle avoidance actions in the existing technologies is not strong enough.

To address the above-described technical problems, a control method for an autonomous mobile device according to an illustrative embodiment is provided as shown in FIG. 1. The autonomous mobile device may include, but not be limited to, for example, a smart floor sweeping robot, a smart floor mopping robot, a sweeping-mopping integrated robot, a companion type robot, a service type mobile robot, a security robot, etc. The execution subject of the control method of the present embodiment may be, but not be limited to, a control unit of the autonomous mobile device, an external device of the autonomous mobile device, etc. For example, a processor included in the autonomous mobile device may execute computer instructions to perform the control method.

Referring to FIG. 1, the control method of the present illustrative embodiment may include the following steps:

Step S110, obtaining point cloud data of the autonomous mobile device in a current work environment. Step S110 may be referred to as an obtaining step.

In this embodiment, the point cloud data of the autonomous mobile device in the work environment may be obtained through a multi-line Lidar device. Of course, other components may be used, as long as the components can obtain the point cloud data of the autonomous mobile device in the work environment.

Using the Lidar device as an example, the Lidar device may emit a sensing signal (laser beams). When encountering an obstacle, the sensing signal may be reflected by the obstacle as a reflected signal that corresponds to the sensing signal. A distance between the autonomous mobile device and the obstacle may be obtained based on the sensing signal and the reflected signal (the distance may be referred to as a relative location of the obstacle). A set of data may be obtained based on the distance, and this set of data may be referred to as point cloud data.

After obtaining the point cloud data, step S120 may be executed.

Step S120, determining whether there exists an obstacle in the work environment based on the point cloud data. Step S120 may also be referred to as a determination step.

In this embodiment, after obtaining the point cloud data of the autonomous mobile device in the current work environment, a determination may be made as to whether there exists an obstacle in the work environment based on the obtained point cloud data.

Continuing to use the Lidar device as an example, if the laser beam emitted by the Lidar device is reflected back, it indicates that there exists an obstacle in the front direction. As such, after obtaining the point cloud data using the Lidar device, a determination may be made as to whether there exists an obstacle in the work environment by determining whether there exists a reflected signal that corresponds to the sensing signal in the point cloud data obtained by the Lidar device.

If there exists a reflected signal that corresponds to the sensing signal in the point cloud data obtained by the Lidar device, it indicates that there exists an obstacle in the work environment, and the determination is "Yes" in step S120, and then step S130 may be executed; conversely, if a reflected signal that corresponds to the sensing signal does not exist in the point cloud data obtained by the Lidar device, it indicates that no obstacle exists in the work environment, and the determination is "No" in step S120, and then step S110 may be repeated. It should be understood that if it is determined that no obstacle exists, then no obstacle avoidance action needs to be executed. Therefore, the autonomous mobile device may continue moving along a predetermined moving route.

In some embodiments, step S120 may include: determining whether there exists an obstacle in the work environment based on first point cloud data (which may be high speed point cloud data) obtained at a predetermined time instance (this process is referred to as a fast cyclic determination); determining whether there exists an obstacle in the work environment based on second point cloud data (which may be low speed point cloud data) obtained within a predetermined time segment (this process is referred to as a low cyclic determination), wherein, if it is determined that there exists an obstacle in the work environment based on the first point cloud data and/or it is determined that there exists an obstacle in the work environment based on the second point cloud data, then the determination step determines that there exists an obstacle in the work environment.

Here, the fast cyclic determination may include: after obtaining the point cloud data, determining whether there exists an obstacle directly based on point cloud data obtained at a current time instance. The slow cyclic determination may include: after obtaining the point cloud data, instead of determining whether exists an obstacle directly based on point cloud data obtained at a current time instance, the following processes may be performed: caching the point cloud data obtained at the current time instance; successively performing coordinate system transformation, a filtering process, and a registering process on the point cloud data obtained in the predetermined time segment (which include point cloud data obtained at historical time instances); sifting the point cloud data that have undergone the registering process, and determining whether there exists an obstacle in the work environment based on data sifted out in the sifting process.

In this embodiment, after obtaining the point cloud data, the two cyclic determinations, i.e., the fast cyclic determination and the slow cyclic determination, may be executed in parallel at every unit time interval, such as 20 ms. That is, for every unit time interval, point cloud data obtained at a predetermined time instance and point cloud data obtained within a predetermined time segment are examined, as long as there is one cyclic determination that determines that there exists an obstacle, the determination in step S120 is that there exists an obstacle in the work environment.

It should be understood that, the fast cyclic determination is based on point cloud data obtained at a predetermined time instance. In other words, the fast cyclic determination is a determination based on point cloud data obtained at a current time instance, i.e., the fast cyclic determination is an instant determination. In contrast, the slow cyclic determination is based on point cloud data obtained within a predetermined time segment. In other words, the slow cyclic determination is a determination based on point cloud data obtained at the current time instance and point cloud data obtained at historical time instances. Therefore, in terms of time, the fast cyclic determination is faster than the slow cyclic determination. In terms of capability of detecting information of obstacles, the information of obstacles detectable by the fast cyclic determination is less than the information of obstacles detectable by the slow cyclic determination. For example, a rough profile of an obstacle may be obtained by fitting historical point cloud data in the slow cyclic determination, whereas the fast cyclic determination may only determine whether there exists an obstacle.

If an obstacle suddenly appears in front of the autonomous mobile device, both of the fast cyclic determination and the slow cyclic determination would obtain point cloud data corresponding to the obstacle. The difference is, the point cloud data in the fast cyclic determination are the most recent, but old point cloud data are not stored. Therefore, the fast cyclic determination is more suitable for detecting a suddenly appearing obstacle. The point cloud data in the slow cyclic determination include old point cloud data plus the most recent point cloud data. Therefore, compared to the fast cyclic determination, the processing speed of the slow cyclic determination is slower.

After it is determined that there exists an obstacle in the current work environment, the following step S130 may be executed.

Step S130, recognizing a type of the obstacle based on the point cloud data.

In this embodiment, after determining in step S120 that there exists an obstacle in the current work environment, any suitable clustering algorithm may be used, such as Partition-based methods, Density-based methods, Hierarchical methods, to cluster the obtained point cloud data, in order to extract information of the obstacle that indicates the shape, size, etc., of the obstacle. Here, partition-based methods may include, for example, k-means algorithm, k-means++ algorithm, bi-kmeans algorithm, etc. The density-based methods may include, for example, DBSCAN algorithm, OPTICS algorithm, etc. The hierarchical methods may include, for example, Agglomerative algorithm, etc. Then, the extracted information of the obstacle may be categorized based on a predetermined rule, such that the existing obstacle may be categorized into a corresponding type of obstacles. In the present disclosure, an Euclidean clustering method may be adopted.

In some embodiments, the point cloud data used to determine the type of the obstacle may be the above-described second point cloud data. For this embodiment, its description may refer to the control method shown in FIG. 4 that is described below. It should be understood that, when the data amount of the second point cloud data is not large, this implementation method may be adopted.

In some embodiments, the point cloud data used for determining the type of the obstacle may be predetermined point cloud data. The predetermined point cloud data may be any suitable point cloud data sifted out from the second point cloud data. For example, the predetermined point cloud data may be point cloud data that are sifted out from the second point cloud data and that are within a predetermined time segment that is separated from a predetermined time instance by a predetermined time range. For this implementation method, its description may refer to the control method shown in FIG. 5 that is described below. It should be understood that, when the data amount of the second point cloud data is large, this implementation method may be adopted, such that the data amount that needs to be processed is reduced, thereby increasing processing efficiency.

In some embodiments, a type of obstacle may include straight line and curved line. The curved line may include, but not be limited to, circle and arc.

For example, the obstacle may be categorized based on a predetermined rule into a first type of obstacle indicating that the shape is a straight line and a second type of obstacle indicating that the shape is a curved line. If the extracted information of the obstacle indicates that the shape of the obstacle is a straight line, then based on the predetermined rule, the obstacle may be categorized into the first type of obstacle; correspondingly, if the extracted information of the obstacle indicates that the shape of the obstacle is a curved line, then based on the predetermined rule, the obstacle may be categorized into the second type of obstacle.

It should be understood that, the present embodiment does not limit the clustering algorithm and the predetermined rule used for categorizing the obstacle. A person having ordinary skills in the art can adopt any suitable clustering algorithm and predetermined rule to perform the clustering and categorization based on actual needs in view of the existing technology. The present disclosure does not describe these in detail.

After the type of the obstacle is recognized, the flowing steps S140 may be executed.

Step S140, executing an obstacle avoidance action corresponding to the type of the obstacle. Here, the steps S130 and S140 may be collectively referred to as processing steps.

In this embodiment, various types of obstacles may be associated with obstacle avoidance actions corresponding to the types of the obstacles. Therefore, after recognizing the type of the obstacle, an obstacle avoidance action corresponding to the type may be executed based on the recognized type of the obstacle. As such, more accurate obstacle avoidance actions may be executed for different types of obstacles.

Continuing with the above example, if the obstacle is categorized into the first type of obstacle, an obstacle avoidance action corresponding to the first type of obstacle (referred to as a first obstacle avoidance action) is executed; if the obstacle is categorized into the second type of obstacle, an obstacle avoidance action corresponding to the second type of obstacle (referred to as a second obstacle avoidance action) is executed. It should be understood that, the first obstacle avoidance action may be different from the second obstacle avoidance action. For example, the first obstacle avoidance action may be a rotating action around a first base line, whereas the second obstacle avoidance action may be a rotating action around a second base line that is different from the first base line. In other words, for different types of obstacles, different obstacle avoidance actions may be executed.

In some embodiments, the first obstacle avoidance action may include: moving the autonomous mobile device such that the autonomous mobile device is perpendicular to a first connecting line, wherein the first connecting line may be a connecting line between a center of the autonomous mobile device and a foot of perpendicular on a straight line type obstacle. That is, the first connecting line passes through the center of the autonomous mobile device and is perpendicular to the straight line type obstacle at the foot of perpendicular. Here, the autonomous mobile device being perpendicular to the first connecting line means that a forward facing direction of the autonomous mobile device is perpendicular to the first connecting line. In other words, the forward facing direction of the autonomous mobile device is parallel with the straight line type obstacle.

Figure 2:
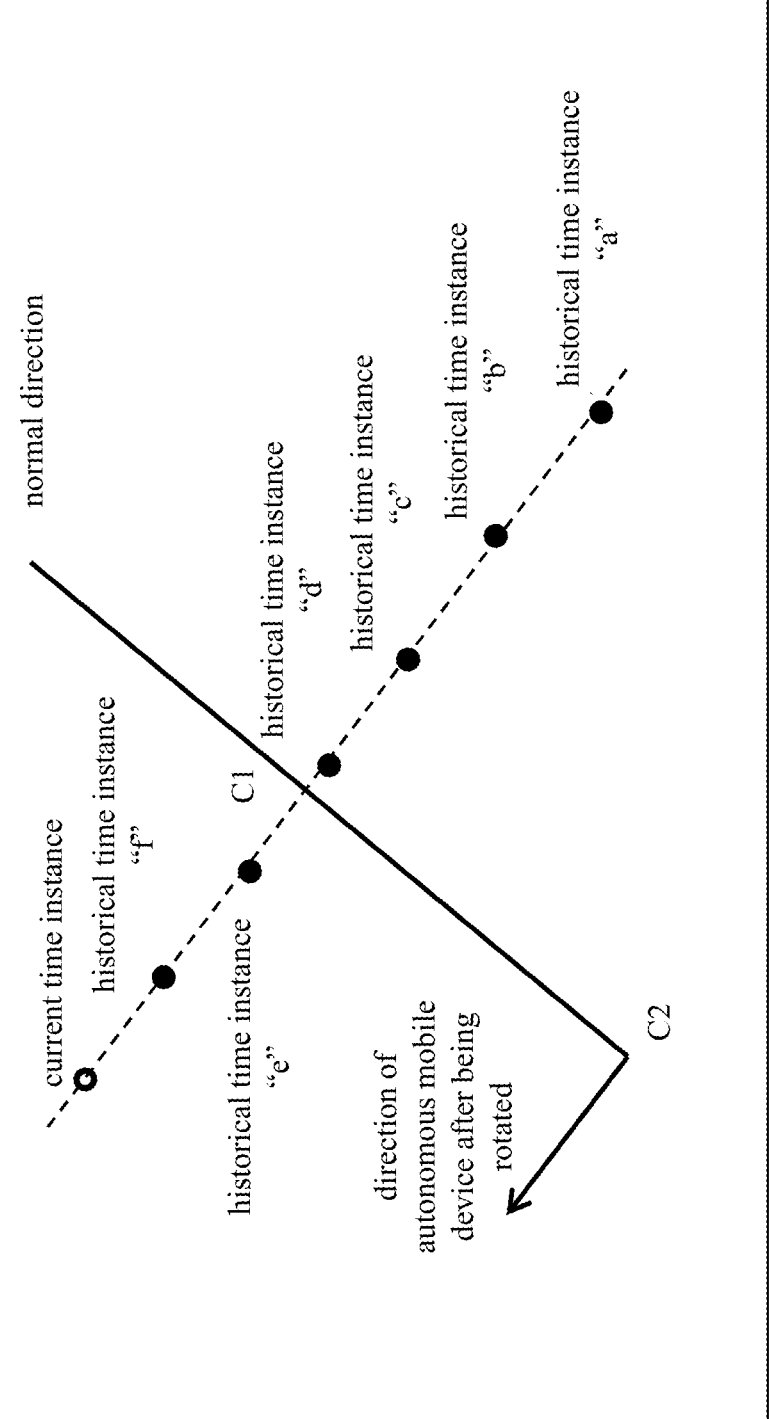
FIG. 2 is a schematic illustration of a first obstacle avoidance action according to an illustrative embodiment.

Illustratively, if fitting the point cloud data of the current time instance and the point cloud data of historical time instance "a" to historical time instance "f" produces a straight line type obstacle, then the type of obstacle recognized based on the point cloud data of the current time instance and the point cloud data of historical time instance "a" to historical time instance "f" is the straight line type. Referring to FIG. 2, using the normal of the straight line type obstacle as a reference, the autonomous mobile device may be moved (including being rotated) such that the autonomous mobile device is perpendicular to the normal, i.e., the forward facing direction (the arrow direction shown in FIG. 2) of the autonomous mobile device after the autonomous mobile device is moved (including being rotated) is perpendicular to the normal. Here, as shown in FIG. 2, the normal of the straight line type obstacle passes through a center C1 of the straight line type obstacle, and an extension of the normal passes through a center C2 of the autonomous mobile device. Thus, the line C1-C2 is an example of the first connecting line described above, and the autonomous mobile device after being rotated is perpendicular to the first connecting line. Here, the first connecting line is an extension of the normal. After being rotated, the autonomous mobile device is perpendicular to the first connecting line, or, in other words, parallel with the straight line type obstacle.

In some embodiments, the second obstacle avoidance action may include: moving the autonomous mobile device such that the autonomous mobile device is perpendicular to a second connecting line, wherein the second connecting line may be a connecting line between a center of the autonomous mobile device and a geometric center of a curved line type obstacle. Here, the autonomous mobile device being perpendicular to the second connecting line means that a forward facing direction of the autonomous mobile device is perpendicular to the second connecting line.

Figure 3:
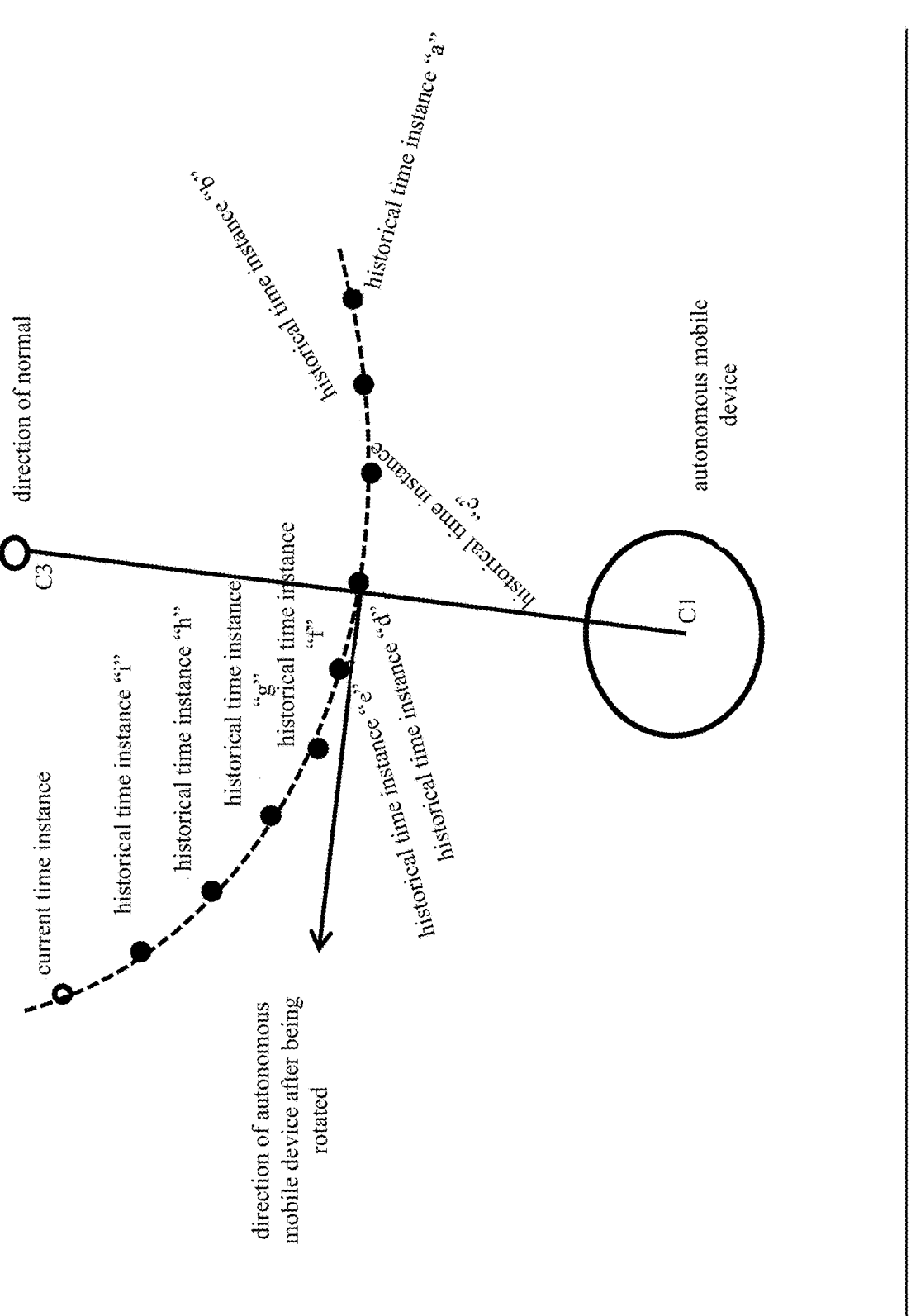
FIG. 3 is a schematic illustration of a second obstacle avoidance action according to an illustrative embodiment.

In this embodiment, if fitting the point cloud data of the current time instance and the point cloud data of historical time instance "a" to historical time instance "f" produces a curved line type obstacle, then the type of obstacle recognized based on the point cloud data of the current time instance and the point cloud data of historical time instance "a" to historical time instance "f" is a curved line type obstacle. Referring to FIG. 3, the connecting line C1-C3 between the center C1 of the autonomous mobile device and the geometric center C3 of the curved line type obstacle is used as the normal, the autonomous mobile device may be moved (including being rotated) such that the autonomous mobile device is perpendicular to the normal, i.e., the forward facing direction (the arrow direction shown in FIG. 3) of the autonomous mobile device after the autonomous mobile device is moved (including being rotated) is perpendicular to the normal.

The autonomous mobile device may attempt to move along other routes, such as to execute a predicament escaping mode (for example, first moving backwardly then rotating, or repeatedly rotating and moving backwardly for multiple times) such that the autonomous mobile device moves away from the obstacle, or execute an edge following mode (for example, first rotating such that a side of the autonomous mobile device is facing the obstacle and continuing moving, at the same time, detecting in a contactless manner by a proximity sensor provided at the side, a distance from the side to the obstacle, and consistently maintaining the distance within a predetermined distance range), such that the autonomous mobile device moves along an edge of the obstacle.

According to the control method of this illustrative embodiment, based on the obtained point cloud data of the autonomous mobile device in the current work environment (for example, a set of relative locations of obstacle(s)), a determination may be made as to whether there exists an obstacle in the work environment. When it is determined that there exists an obstacle, a type of the obstacle may be recognized based on the point cloud data and an obstacle avoidance action corresponding to the recognized type of obstacle may be executed. As such, compared to existing technologies, in which a shape of the obstacle is determined based on information of obstacle obtained by a Lidar device and an obstacle avoidance action is executed, in the present disclosure, more accurate obstacle avoidance actions may be executed for different types of obstacles, thereby increasing the robustness of the obstacle avoidance actions.

In some embodiments, when it is determined in step S120 that there exists an obstacle, a further determination may be made as to whether a distance between the autonomous mobile device and the obstacle (referred to as a relative distance) is equal to or smaller than a predetermined minimum value (i.e., determining whether the relative distance falls within an alert range); if it is determined that the relative distance falls within the alert range, steps S130 and S140 may be executed.

In this embodiment, when there exists an obstacle and the autonomous mobile device is close to the obstacle (i.e., the autonomous mobile device is about to collide with the obstacle), steps S130 and S140 may be executed.

Here, the alert range is a minimum distance from the autonomous mobile device to the obstacle, i.e., the predetermined minimum value of the relative distance. When the autonomous mobile device is moving, a moving velocity in the forward direction is relatively faster. In order to avoid the accidental collision between the autonomous mobile device and the obstacle, the predetermined minimum value in the forward direction of the autonomous mobile device may be set to be relatively large. On the other hand, in order to ensure the cleaning effect of the autonomous mobile device cleaning along the edge, the predetermined minimum value in a side direction of the autonomous mobile device may be set to be relatively smaller. In other words, the predetermined minimum value in the forward direction of the autonomous mobile device is typically larger than the predetermined minimum value in the side direction of the autonomous mobile device. Illustratively, for example, the predetermined minimum value in the forward direction may be 5 cm, and the predetermined minimum value in the side direction may be 3 cm. Thus, the alert range may be smaller than or equal to 5 cm in the forward direction, and smaller than or equal to 3 cm in the side direction. When the relative distance between the autonomous mobile device and the obstacle in the forward direction falls within the alert range (i.e., smaller than or equal to 5 cm), steps S130 and S140 may be executed. Here, in FIG. 4, examples of step S130 ("Obstacle recognition") are depicted in a dashed line box as steps S408-S410, and an example of step S140 ("Executing obstacle avoidance action") is depicted as step S411.

Figure 4:
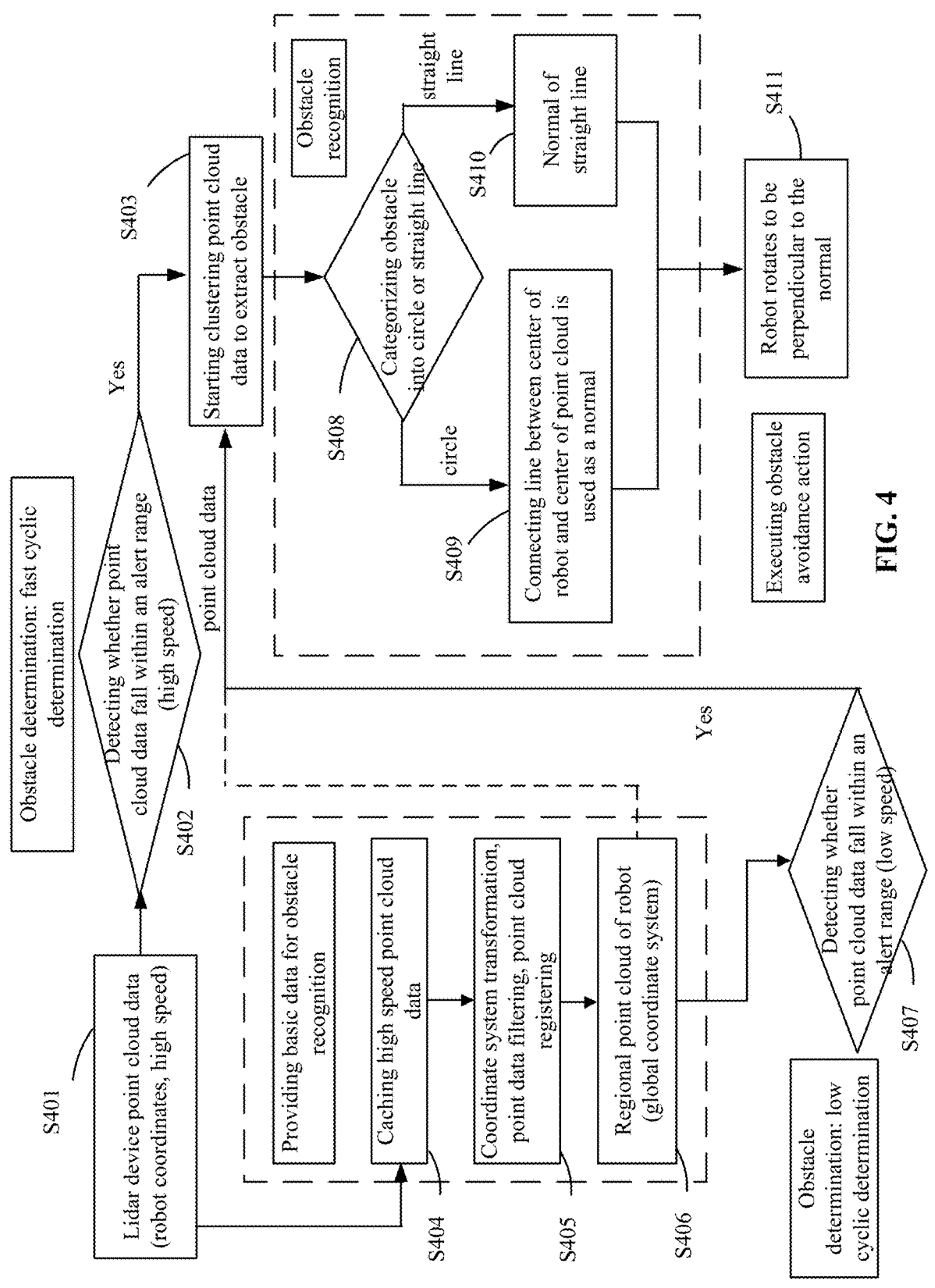
FIG. 4 is a flowchart illustrating a control method for an autonomous mobile device according to an illustrative embodiment.

Referring to FIG. 4, the control method of this illustrative embodiment may include the following steps:

Step S401, obtaining point cloud data. For step S401, its description may refer to the descriptions provided above for step S110.

Illustratively, the point cloud data may be obtained through a Lidar device. Point cloud data obtained through the Lidar device may be referred to as Lidar device point cloud data. It should be understood that the obtained point cloud data are data in a robot coordinate system, which are point cloud data obtained at the current time instance, and are therefore high speed point cloud data.

It should be understood that, after obtaining the point cloud data, step S120 may be executed to determine whether there exists an obstacle; when it is determined that there exists an obstacle, the fast cyclic determination and the slow cyclic determination may be executed in parallel, wherein, the fast cyclic determination may include the following steps S402 and S403; the slow cyclic determination may include the following steps: S404, S405, S406, S407 and S403.

Step S402, determining whether an alert range is reached based on the obtained high speed point cloud data. Description of step S402 may refer to the above descriptions relating to the alert range.

If the determination in step S402 is "Yes" (i.e., the alert range is reached), the following step S403 may be executed.

Step S403, clustering the point cloud data to extract information of obstacle. For step S403, its description may refer to the above descriptions of step S130.

Step S404, caching the obtained point cloud data. The point cloud data cached may be high speed data point cloud data.

Step S405, successively performing coordinate system transformation, a filtering process and a registering process on the cached point cloud data.

Step S406, sifting the point cloud data that have undergone the registering process, to obtain regional point cloud data of the autonomous mobile device. The regional point cloud data are data in a global coordinate system.

For steps S404, S405 and S406, their descriptions may refer to the above descriptions of the slow cyclic determination.

Step S407, determining whether the alert range has been reached based on the obtained low speed point cloud data. For step S407, its description may refer to the above descriptions of the alert range.

If the determination at step S407 is "Yes" (i.e., the alert range has been reached), step S403 may be executed.

After executing step S403 to extract the information of obstacle, step S408 may be executed. Illustratively, assuming that while moving straight, the autonomous mobile device detects an obstacle at a location that is 30 degree to the autonomous mobile device at the left front side, the autonomous mobile device may stop moving and execute step S408.

Step S408, categorizing the obstacle based on the extracted information of obstacle. For step S408, its description may refer to the above description of step S130.

The point cloud data used to recognize the type of the obstacle are historical point cloud data. For example, assuming the historical point cloud data include 20 point cloud data that are constantly cached and updated, when at least one of the fast cyclic determination and the slow cyclic determination determines that there exists an obstacle, the 20 point cloud data may be clustered to recognize the type of the obstacle.

If the obstacle is categorized in step S408 as a circle type obstacle (from the above descriptions, it can be known that the circle type obstacle is a type of the curved line type obstacles), the following step S409 may be executed. If the obstacle is categorized in step S408 as a straight line type obstacle, the following step S410 may be executed.

Step S409, connecting a center of the autonomous mobile device (from the above descriptions, it can be known that a robot is a type of the autonomous mobile device) and a geometric center of the curved line type obstacle (e.g., a circle type obstacle), and using the connecting line as a normal.

Step S410, connecting the center of the autonomous mobile device and a center of the straight line type obstacle, and using the connecting line as a normal.

Step S411, moving the autonomous mobile device such that the autonomous mobile device is perpendicular to the normal. For example, the autonomous mobile device may be rotated such that a forward facing direction of the autonomous mobile device is perpendicular to the normal.

For steps S409, S410 and S411, their descriptions may refer to the above descriptions relating to the first obstacle avoidance action and the second obstacle avoidance action.

According to the control method of this illustrative embodiment, different obstacle avoidance actions may be executed for the circle type obstacle and the straight line type obstacle, thereby realizing more accurate obstacle avoidance actions, and hence increasing the robustness of the obstacle avoidance actions.

In some embodiments, if the distance from the obstacle to the autonomous mobile device is smaller than a radius of the autonomous mobile device, the autonomous mobile device may stop moving straight.

In some embodiments, when it is determined in step S120 that there exists an obstacle, a quantity of the obstacles may be further determined. When it is determined that the quantity of the obstacles is 1, the above-described steps S130 and S140 may be executed.

In this embodiment, if it is determined based on the point cloud data that only one obstacle exists in the surrounding environment of the autonomous mobile device, the type of the obstacle may be recognized directly based on the point cloud data, and an obstacle avoidance action corresponding to the recognized type of obstacle may be executed.

In some embodiments, when it is determined in step S120 that there exists an obstacle, a quantity of the obstacles may be further determined. If it is determined that the quantity of the obstacles is 2 or more, the type of obstacle that is closest to the autonomous mobile device may be recognized based on the point cloud data, and an obstacle avoidance action corresponding to the type of the closest obstacle may be executed.

In this embodiment, if it is determined based on the point cloud data that there exist multiple obstacles in the surrounding environment of the autonomous mobile device, the types of the multiple obstacles may be recognized respectively, and obstacle avoidance actions corresponding to the different types may be determined. An obstacle that is closest to the autonomous mobile device may be determined from the multiple obstacles, and an obstacle avoidance action corresponding to the type of the determined obstacle may be executed.

Illustratively, assuming that there exist a first obstacle, a second obstacle and a third obstacle, a total of 3 obstacles, in the surrounding environment of the autonomous mobile device, and the autonomous mobile device may recognize that the types of the first obstacle, the second obstacle and the third obstacle are straight line type, straight line type and curved line type (e.g., circle type), and may determine that the obstacle avoidance actions corresponding to the first obstacle, the second obstacle and the third obstacle are a first action, a second action and a third action, respectively; the autonomous mobile device may calculate a first distance from itself to the first obstacle, a second distance from itself to the second obstacle, and a third distance from itself to the third obstacle, compare the first distance, the second distance and the third distance to determine that the first distance is the smallest distance, and the autonomous mobile device may determine that the obstacle closest to itself is the first obstacle (the first obstacle is located at a location that is 30 degrees on the left front side of the autonomous mobile device); the autonomous mobile device may execute the first action, for example, an obstacle avoidance action that includes first rotating 30 degrees to the right or rotating 120 degrees to the left and then moving straight. As such, the autonomous mobile device can avoid the obstacle.

Alternatively, if it is determined based on the point cloud data that there exist multiple obstacles in the surrounding environment of the autonomous mobile device, an obstacle that is closest to the autonomous mobile device may be determined from the multiple obstacles, a type of the determined obstacle may be recognized and an obstacle avoidance action corresponding to the type may be determined, and then the obstacle avoidance action may be executed.

Illustratively, assuming that there exist 3 obstacles in the surrounding environment of the autonomous mobile device:

first obstacle, second obstacle and third obstacle, the autonomous mobile device may determine that the obstacle closest to the autonomous mobile device is the first obstacle that is located at a location that is 30 degrees on the left front side of the autonomous mobile device; the autonomous mobile device may recognize that the type of the first obstacle is a straight line type obstacle; the autonomous mobile device may determine that an obstacle avoidance action corresponding to the straight line type obstacle includes rotating 30 degrees to the right or rotating 120 degrees to the left and then moving straight; the rotating angle of the straight line type obstacle is rotating 30 degrees to the right or rotating 120 degrees to the left. Therefore, the autonomous mobile device may execute an obstacle avoidance action that includes rotating 30 degrees to the right or rotating 120 degrees to the left and then moving straight. As such, the autonomous mobile device can avoid the first obstacle.

In some embodiments, step S130 may include: sifting the point cloud data to obtain point cloud data that satisfy a predetermined condition; recognizing a type of the obstacle based on the point cloud data sifted out in the sifting process, wherein, the point cloud data that satisfy the predetermined condition include point cloud data that are closest to the autonomous mobile device and a predetermined number of point cloud data adjacent to the point cloud data that satisfy the predetermined condition.

In this embodiment, the point cloud data used for recognizing the type of the obstacle are data sifted out from historical point cloud data and are within a predetermined range of a closest point relative to the autonomous mobile device. The point cloud data obtained in the sifting process are actually the above-described predetermined point cloud data. As such, the data amount that needs to be processed is reduced, thereby increasing the processing efficiency.

Illustratively, assuming that the historical point cloud data include 20 point cloud data that are constantly cached and updated, when at least one of the fast cyclic determination and the slow cyclic determination determines that there exists an obstacle, point cloud data that are closest to the autonomous mobile device and for example, 3 point cloud data that are adjacent to the closest point cloud data, are selected. These four selected point cloud data are used as data for the clustering process.

Figure 5:
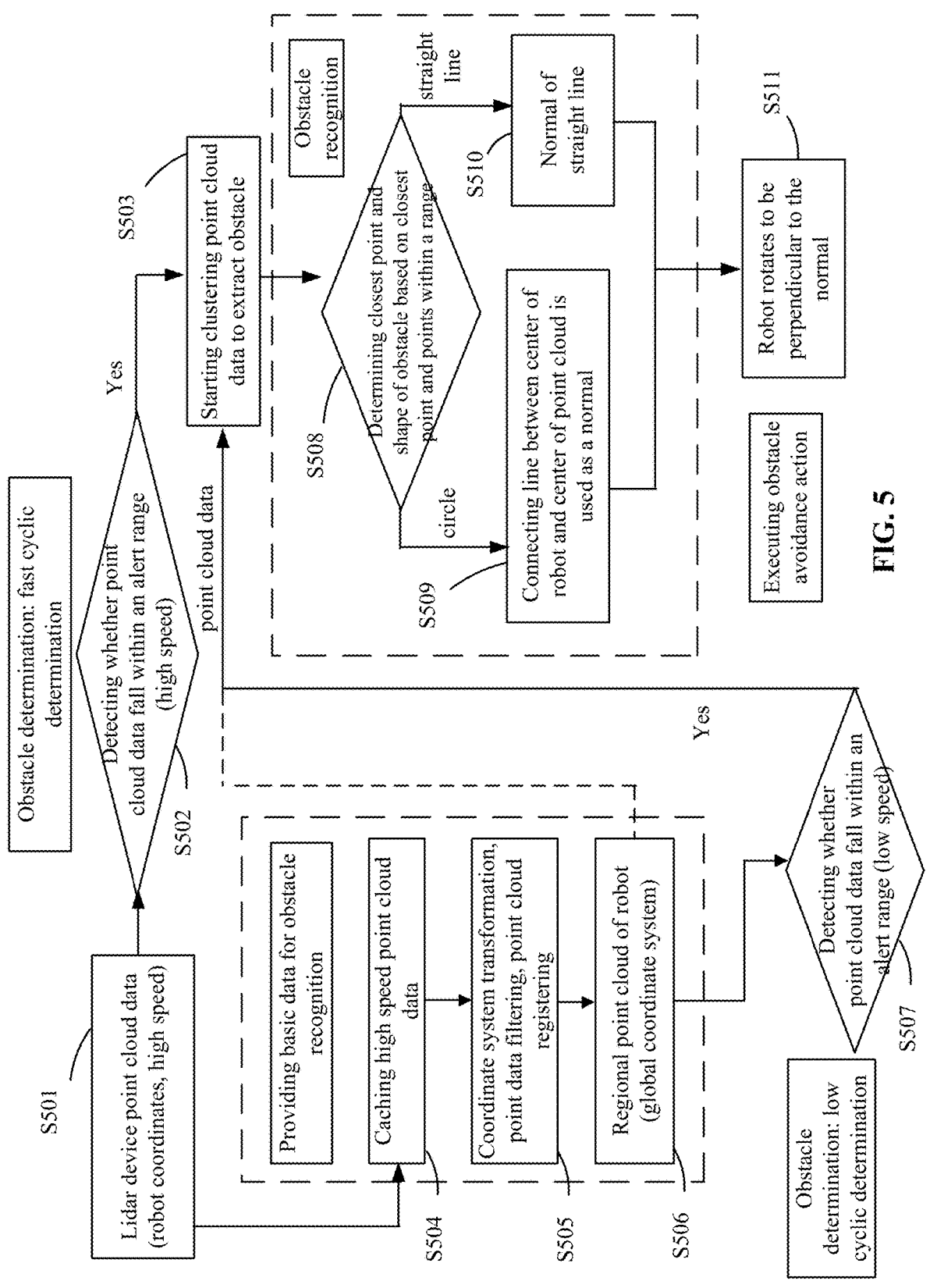
FIG. 5 is a flowchart illustrating a control method for an autonomous mobile device according to an illustrative embodiment.

Referring to FIG. 5, the control method of this illustrative embodiment may include the following steps:

Step S501, obtaining point cloud data.

Step S502, determining whether an alert range is reached based on the obtained high speed point cloud data.

Step S503, clustering the point cloud data to extract information of obstacle.

Step S504, caching the obtained point cloud data. The cached point cloud data may be high speed point cloud data.

Step S505, successively performing coordinate system transformation, a filtering process and a registering process on the cached point cloud data.

Step S506, sifting the point cloud data that have undergone the registering process, to obtain regional point cloud data of the autonomous mobile device. The regional point cloud data are data in a global coordinate system.

Step S507, determining whether the alert range has been reached based on the obtained low speed point cloud data.

Step S508, determining point cloud data that are closest to the autonomous mobile device, and categorizing the obstacles based on the determined point cloud data and a plurality of point cloud data surrounding the determined point cloud data within a predetermined range.

Step S509, connecting a center of the autonomous mobile device and a geometric center of a curved line type obstacle (e.g., a circle type obstacle), and using the connecting line as a normal.

Step S510, connecting the center of the autonomous mobile device and a center of a straight line type obstacle, and using the connecting line as the normal.

Step S511, rotating the autonomous mobile device such that the autonomous mobile device is perpendicular to the normal. For example, a forward facing direction of the autonomous mobile device may be perpendicular to the normal.

The steps S501 to S507 and S509 to S511 in FIG. 5 are the same as the steps S401 to S407 and S409 to S411 in FIG. 4. Therefore, due to the space limitation, in this embodiment, only the differences between FIG. 5 and FIG. 4 are described. Compared to FIG. 4, in which the point cloud data used are all historical point cloud data (second point cloud data), in FIG. 5, the point cloud data used are data (predetermined point cloud data) sifted out from all of the historical point cloud data and are within a predetermined range of a point that is closest to the autonomous mobile device (e.g., a robot), the detailed examples of which can refer to the above descriptions.

According to the control method of this illustrative embodiment, the point cloud data used for categorizing the obstacle are point cloud data that are sifted out from all of the historical point cloud data and that satisfy a predetermined condition. As such, the data amount that needs to be processed is reduced, thereby increasing the processing efficiency.

Figure 6:
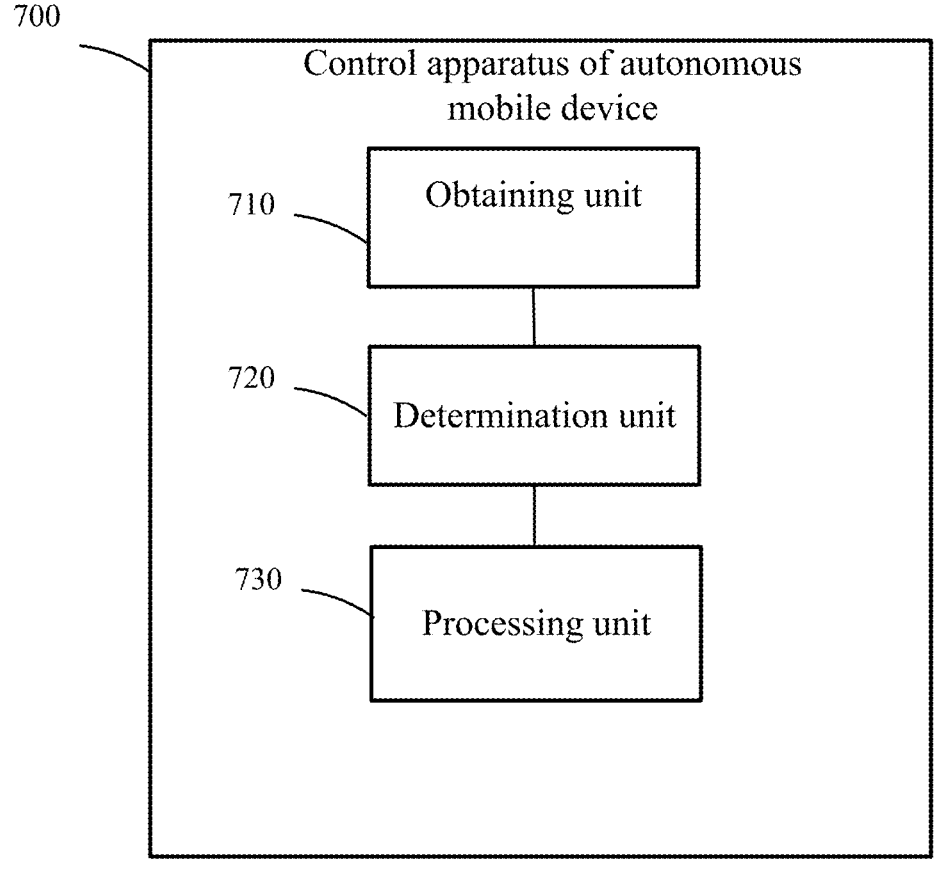
FIG. 6 is a diagram of a control apparatus of an autonomous mobile device according to an illustrative embodiment.

FIG. 6 is a diagram of a control apparatus of the autonomous mobile device according to an illustrative embodiment. Referring to FIG. 6, a control apparatus 700 of the autonomous mobile device may include an obtaining unit 710, a determination unit 720 and a processing unit 730. In some embodiments, the control apparatus 700 may include both hardware and software components. For example, the control apparatus 700 may include a processor, a data storage device, and electronic circuits. The processor may be any suitable processor, such as a central processing unit (CPU), a graphics processing unit (GPU), a digital signal processor, or any other suitable processors having computing or data processing capabilities. The processor may be programmed to execute computer instructions stored in the data storage device. The data storage device may be any non-transitory data storage medium, such as a flash drive, a read-only memory, a random-access memory, a magnetic disk, a hard disk, etc. Each of the obtaining unit 710, the determination unit 720, and the processing unit 730 may include both hardware and software components. For example, each of the units 710, 720, and 730 may include a portion of the processor, a portion of the data storage device, and/or a portion of the electronic circuits. In some embodiments, the obtaining unit 710 may be configured to obtain point cloud data of the autonomous mobile device in the current work environment. The determination unit 720 may be connected with the obtaining unit 710, and may be configured to determine whether there exists an obstacle in the work environment based on the point cloud data. The processing unit 730 may be connected with the obtaining unit 710 and the determination unit 720, and may be configured to, when the determination unit 720 determines that there exists an obstacle, recognize a type of the obstacle based on the point cloud data obtained by the obtaining unit 710, and execute an obstacle avoidance action corresponding to the type of the obstacle.

In some embodiments, the determination unit 720 may be configured to: determine whether there exists an obstacle in the work environment based on first point cloud data obtained at a predetermined time instance; determine whether there exists an obstacle in the work environment based on second point cloud data obtained within a predetermined time period, wherein, when it is determined that there exists an obstacle in the work environment based on the first point cloud data and/or it is determined that there exists an obstacle in the work environment based on the second point cloud data, the determination unit 720 determines that there exists an obstacle in the work environment.

In some embodiments, the processing unit 730 may be configured to: categorize the obstacle existing in the work environment based on the second point cloud data; execute a first obstacle avoidance action for a first type of obstacle; execute a second obstacle avoidance action for a second type of obstacle that is different from the first type.

In some embodiments, the processing unit 730 may be configured to: categorize the obstacle existing in the work environment based on predetermined point cloud data, wherein the predetermined point cloud data are point cloud data that that are sifted out from the second point cloud data and that are within a predetermined time segment that is separated from a predetermined time instance by a predetermined time range; execute a first obstacle avoidance action for a first type of obstacle; execute a second obstacle avoidance action for a second type of obstacle that is different from the first type.

In some embodiments, the first type may be a straight line, the first obstacle avoidance action may include: rotating the autonomous mobile device such that the autonomous mobile device is perpendicular to a first connecting line, wherein the first connecting line may be a connecting line between a center of the autonomous mobile device and a foot of perpendicular on a straight line type obstacle; the second type is a curved line, the second obstacle avoidance action may include: rotating the autonomous mobile device such that the autonomous mobile device is perpendicular to a second connecting line, wherein the second connecting line may be a connecting line between the center of the autonomous mobile device and a geometric center of a curved line type obstacle.

In some embodiments, the processing unit 730 may be configured to: when the determination unit 720 determines that there exists an obstacle, determine a quantity of the obstacles; when determining that the quantity of the obstacle is 1, recognize a type of the obstacle based on the point cloud data, and execute an obstacle avoidance action corresponding to the type of the obstacle; when determining that the quantity of the obstacles is 2 or more, recognize a type of an obstacle that is closest to the autonomous mobile device based on the point cloud data, and execute an obstacle avoidance action corresponding to a type of the closest obstacle.

In some embodiments, the control apparatus 700 of the autonomous mobile device may also include: a first determination unit (not shown), configured to determine whether a distance between the autonomous mobile device and the obstacle is equal to or smaller than a predetermined minimum value; when determining that the distance is equal to or smaller than the predetermined minimum value, the processing unit 730 may recognize the type of the obstacle based on the point cloud data, and execute an obstacle avoidance action corresponding to the type of the obstacle.

Figure 7:
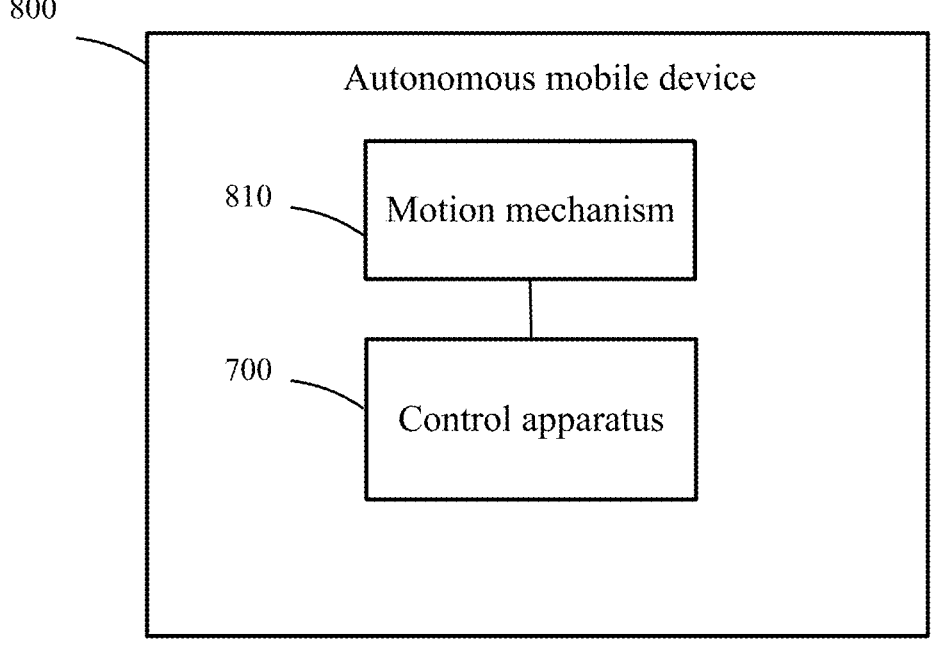
FIG. 7 is a diagram of an autonomous mobile device according to an illustrative embodiment.

FIG. 7 is a diagram of the autonomous mobile device according to an illustrative embodiment. Referring to FIG. 7, an autonomous mobile device 800 may include the control apparatus 700 shown in FIG. 6 and a motion mechanism 810. The motion mechanism 810 may be connected with the control apparatus 700, and may be configured to move the autonomous mobile device 800 in the current work environment; when there exists an obstacle in the current work environment, the motion mechanism 810 may move according to the obstacle avoidance action in order to avoid the obstacle. The motion mechanism 810 may include, but not be limited to, a set of wheels.

In the apparatus of the above embodiments, the detailed methods of operation of each unit have already been described in embodiments relating to such methods, which are not repeated here.

The above described various embodiments of the present disclosure. The above descriptions are illustrative, and are not exhaustive, and do not limit the disclosed various embodiments. Without deviating from the scope and spirit of the described various embodiments, many modifications and changes are obvious to a person having ordinary skills in the art. The terms used in the present disclosure are selected for the purpose of best explaining the principles of various embodiments, actual implementations or improvements to the technologies in the market, or for the purpose of helping other persons having ordinary skills in the art to understand the various embodiments of the present disclosure.

What is claimed is:

1. A control method for an autonomous mobile device, comprising:

an obtaining step configured to obtain point cloud data of the autonomous mobile device in a work environment;

a determination step configured to determine whether there exists an obstacle in the work environment based on the point cloud data; and a processing step configured to, when it is determined that there exists an obstacle, recognize a type of the obstacle based on the point cloud data, and execute an obstacle avoidance action corresponding to the type of the obstacle, wherein the processing step comprises:

determining a quantity of obstacles when it is determined that there exists an obstacle;

when it is determined that the quantity of obstacles is one, recognizing the type of the obstacle based on the point cloud data, and executing the obstacle avoidance action corresponding to the type of the obstacle; and when it is determined that the quantity of obstacles is two or more, recognizing a type of an obstacle that is closest to the autonomous mobile device based on the point cloud data, and executing an obstacle avoidance action corresponding to the type of the closest obstacle.

2. The control method according to claim 1, wherein the determination step also comprises:

determining whether there exists an obstacle in the work environment based on first point cloud data obtained at a predetermined time instance; and determining whether there exists an obstacle in the work environment based on second point cloud data obtained within a predetermined time segment, wherein, when it is determined that there exists an obstacle in the work environment based on the first point cloud data and/or it is determined that there exists an obstacle in the work environment based on the second point cloud data, the determination step determines that there exists an obstacle in the work environment.

3. The control method according to claim 2, wherein the processing step also comprises:

categorizing the obstacle existing in the work environment based on the second point cloud data into a first type of obstacle or a second type of obstacle;

executing a first obstacle avoidance action when the obstacle existing in the work environment is categorized into the first type of obstacle; and executing a second obstacle avoidance action when the obstacle existing in the work environment is categorized into the second type of obstacle that is different from the first type of obstacle.

4. The control method according to claim 3, wherein the first type of obstacle is a straight line type of obstacle, the first obstacle avoidance action includes: moving the autonomous mobile device according to a first connecting line to avoid the obstacle, wherein the first connecting line is a connecting line between a center of the autonomous mobile device and a foot of perpendicular on the straight line type obstacle; and the second type of obstacle is a curved line type of obstacle, the second obstacle avoidance action includes: moving the autonomous mobile device according to a second connecting line to avoid the obstacle, wherein the second connecting line is a connecting line between the center of the autonomous mobile device and a center of the curved line type obstacle.

5. The control method according to claim 2, wherein the processing step also comprises:

categorizing the obstacle existing in the work environment based on predetermined point cloud data into a first type of obstacle or a second type of obstacle, wherein the predetermined point cloud data are point cloud data sifted out from the second point cloud data;

executing a first obstacle avoidance action when the obstacle existing in the work environment is categorized into the first type of obstacle; and executing a second obstacle avoidance action when the obstacle existing in the work environment is categorized into the second type of obstacle that is different from the first type of obstacle.

6. The control method according to claim 5, wherein the first type of obstacle is a straight line type of obstacle, the first obstacle avoidance action includes: moving the autonomous mobile device according to a first connecting line to avoid the obstacle, wherein the first connecting line is a connecting line between a center of the autonomous mobile device and a foot of perpendicular on the straight line type obstacle; and the second type of obstacle is a curved line type of obstacle, the second obstacle avoidance action includes: moving the autonomous mobile device according to a second connecting line to avoid the obstacle, wherein the second connecting line is a connecting line between the center of the autonomous mobile device and a center of the curved line type obstacle.

7. The control method according to claim 1, wherein prior to the processing step, the method further comprises:

determining whether a distance between the autonomous mobile device and the obstacle is equal to or smaller than a predetermined minimum value; and when it is determined that the distance is equal to or smaller than the predetermined minimum value, executing the processing step.

8. An autonomous mobile device, comprising:

a control apparatus including:

an obtaining unit configured to obtain point cloud data of the autonomous mobile device in a work environment;

a determination unit configured to determine whether there exists an obstacle in the work environment based on the point cloud data; and a processing unit configured to, when it is determined that there exists an obstacle, recognize a type of the obstacle based on the point cloud data, and execute an obstacle avoidance action corresponding to the type of the obstacle; and a motion mechanism configured to move the autonomous mobile device in the work environment, wherein when an obstacle exists in the work environment, the motion mechanism is configured to move according to the obstacle avoidance action to avoid the obstacle, wherein the processing unit is configured to:

determine a quantity of obstacles when it is determined that there exists an obstacle;

when it is determined that the quantity of obstacles is one, recognize the type of the obstacle based on the point cloud data, and execute the obstacle avoidance action corresponding to the type of the obstacle; and when it is determined that the quantity of obstacles is two or more, recognize a type of an obstacle that is closest to the autonomous mobile device based on the point cloud data, and execute an obstacle avoidance action corresponding to the type of the closest obstacle.

9. The autonomous mobile device according to claim 8, wherein the determination unit is also configured to:

determine whether there exists an obstacle in the work environment based on first point cloud data obtained at a predetermined time instance; and determine whether there exists an obstacle in the work environment based on second point cloud data obtained within a predetermined time segment, wherein, when it is determined that there exists an obstacle in the work environment based on the first point cloud data and/or it is determined that there exists an obstacle in the work environment based on the second point cloud data, the determination unit determines that there exists an obstacle in the work environment.

10. The autonomous mobile device according to claim 9, wherein the processing unit is also configured to:

categorize the obstacle existing in the work environment based on the second point cloud data into a first type of obstacle or a second type of obstacle;

execute a first obstacle avoidance action when the obstacle existing in the work environment is categorized into the first type of obstacle; and execute a second obstacle avoidance action when the obstacle existing in the work environment is categorized into the second type of obstacle that is different from the first type of obstacle.

11. The autonomous mobile device according to claim 10, wherein the first type of obstacle is a straight line type of obstacle, the motion mechanism is configured to move according to the first obstacle avoidance action, including: moving the autonomous mobile device according to a first connecting line to avoid the obstacle, wherein the first connecting line is a connecting line between a foot of perpendicular on the autonomous mobile device and a center of the straight line type obstacle; and the second type of obstacle is a curved line type of obstacle, the motion mechanism is configured to move according to the second obstacle avoidance action, including: moving the autonomous mobile device according to a second connecting line to avoid the obstacle, wherein the second connecting line is a connecting line between the center of the autonomous mobile device and a center of the curved line type obstacle.

12. The autonomous mobile device according to claim 9, wherein the processing unit is also configured to:

categorize the obstacle existing in the work environment based on predetermined point cloud data into a first type of obstacle or a second type of obstacle, wherein the predetermined point cloud data are point cloud data sifted out from the second point cloud data;

execute a first obstacle avoidance action when the obstacle existing in the work environment is categorized into the first type of obstacle; and execute a second obstacle avoidance action when the obstacle existing in the work environment is categorized into the second type of obstacle that is different from the first type of obstacle.

13. The autonomous mobile device according to claim 12, wherein the first type of obstacle is a straight line type of obstacle, the motion mechanism is configured to move according to the first obstacle avoidance action, including: moving the autonomous mobile device according to a first connecting line to avoid the obstacle, wherein the first connecting line is a connecting line between a center of the autonomous mobile device and a foot of perpendicular on the straight line type obstacle; and the second type of obstacle is a curved line type of obstacle, the motion mechanism is configured to move according to the second obstacle avoidance action, including: moving the autonomous mobile device according to a second connecting line to avoid the obstacle, wherein the second connecting line is a connecting line between the center of the autonomous mobile device and a center of the curved line type obstacle.

14. A non-transitory computer-readable storage medium storing instructions, wherein when the instructions stored in the storage medium are executed by a processor of a control apparatus of an autonomous mobile device, the processor executes a control method comprising:

an obtaining step configured to obtain point cloud data of the autonomous mobile device in a work environment;

a determination step configured to determine whether there exists an obstacle in the work environment based on the point cloud data; and a processing step configured to, when it is determined that there exists an obstacle, recognize a type of the obstacle based on the point cloud data, and execute an obstacle avoidance action corresponding to the type of the obstacle, wherein the processing step comprises:

determining a quantity of obstacles when it is determined that there exists an obstacle;

when it is determined that the quantity of obstacles is one, recognizing the type of the obstacle based on the point cloud data, and executing the obstacle avoidance action corresponding to the type of the obstacle; and when it is determined that the quantity of obstacles is two or more, recognizing a type of an obstacle that is closest to the autonomous mobile device based on the point cloud data, and executing an obstacle avoidance action corresponding to the type of the closest obstacle.

15. The non-transitory computer-readable storage medium according to claim 14, wherein the determination step also comprises:

determining whether there exists an obstacle in the work environment based on first point cloud data obtained at a predetermined time instance; and determining whether there exists an obstacle in the work environment based on second point cloud data obtained within a predetermined time segment, wherein, when it is determined that there exists an obstacle in the work environment based on the first point cloud data and/or it is determined that there exists an obstacle in the work environment based on the second point cloud data, the determination step determines that there exists an obstacle in the work environment.

16. The non-transitory computer-readable storage medium according to claim 15, wherein the processing step also comprises:

categorizing the obstacle existing in the work environment based on the second point cloud data into a first type of obstacle or a second type of obstacle;

executing a first obstacle avoidance action when the obstacle existing in the work environment is categorized into the first type of obstacle; and executing a second obstacle avoidance action when the obstacle existing in the work environment is categorized into the second type of obstacle that is different from the first type of obstacle.

17. The non-transitory computer-readable storage medium according to claim 16, wherein the first type of obstacle is a straight line type of obstacle, the first obstacle avoidance action includes: moving the autonomous mobile device according to a first connecting line to avoid the obstacle, wherein the first connecting line is a connecting line between a center of the autonomous mobile device and a foot of perpendicular on the straight line type obstacle; and the second type of obstacle is a curved line type of obstacle, the second obstacle avoidance action includes: moving the autonomous mobile device according to a second connecting line to avoid the obstacle, wherein the second connecting line is a connecting line between the center of the autonomous mobile device and a center of the curved line type obstacle.

18. The non-transitory computer-readable storage medium according to claim 15, wherein the processing step also comprises:

categorizing the obstacle existing in the work environment based on predetermined point cloud data into a first type of obstacle or a second type of obstacle, wherein the predetermined point cloud data are point cloud data sifted out from the second point cloud data;

executing a first obstacle avoidance action when the obstacle existing in the work environment is categorized into the first type of obstacle; and executing a second obstacle avoidance action when the obstacle existing in the work environment is categorized into the second type of obstacle that is different from the first type of obstacle.

* * * * *